United States Patent
Barti et al.

(10) Patent No.: US 11,456,630 B2
(45) Date of Patent: Sep. 27, 2022

(54) ROTOR AND METHOD FOR PRODUCING A ROTOR

(71) Applicant: Bayerische Motoren Werke Aktiengesellschaft, Munich (DE)

(72) Inventors: Endre Barti, Munich (DE); Florian Beck, Freising (DE); Daniel Loos, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 133 days.

(21) Appl. No.: 16/772,112

(22) PCT Filed: Sep. 27, 2018

(86) PCT No.: PCT/EP2018/076260
§ 371 (c)(1),
(2) Date: Jun. 11, 2020

(87) PCT Pub. No.: WO2019/115043
PCT Pub. Date: Jun. 20, 2019

(65) Prior Publication Data
US 2021/0367461 A1 Nov. 25, 2021

(30) Foreign Application Priority Data
Dec. 13, 2017 (DE) ...................... 10 2017 222 610.2

(51) Int. Cl.
*H02K 15/10* (2006.01)
*H02K 15/12* (2006.01)
(Continued)

(52) U.S. Cl.
CPC ................. *H02K 1/24* (2013.01); *H02K 3/48* (2013.01); *H02K 15/10* (2013.01); *H02K 15/12* (2013.01); *H02K 15/00* (2013.01)

(58) Field of Classification Search
CPC ........ H02K 1/24; H02K 15/10; H02K 15/105; H02K 15/022; H02K 3/46; H02K 3/48; H02K 3/487
(Continued)

(56) References Cited

U.S. PATENT DOCUMENTS

| 6,946,758 B2 * | 9/2005 | Du ........................ H01R 39/32 310/235 |
| 2013/0313939 A1 * | 11/2013 | Hiramitsu ................ H02K 3/34 310/195 |

(Continued)

FOREIGN PATENT DOCUMENTS

| CN | 105811628 A | 7/2016 |
| DE | 10 2006 003 498 A1 | 8/2007 |

(Continued)

OTHER PUBLICATIONS

International Search Report (PCT/ISA/210) issued in PCT Application No. PCT/EP2018/076260 dated Dec. 3, 2018 with English translation (five (5) pages).
(Continued)

*Primary Examiner* — Burton S Mullins
(74) *Attorney, Agent, or Firm* — Crowell & Moring LLP

(57) ABSTRACT

A rotor for an electrical machine has at least one groove, the at least one groove includes a groove bottom and groove walls. A separating element is provided between the groove walls, and extends along the groove. The separating element is arranged on the groove bottom, at least in sections, such that groove chambers are formed along the groove.

9 Claims, 3 Drawing Sheets

(51) Int. Cl.
  *H02K 15/00* (2006.01)
  *H02K 1/24* (2006.01)
  *H02K 3/48* (2006.01)

(58) Field of Classification Search
  USPC .......................................................... 310/43
  See application file for complete search history.

(56) References Cited

U.S. PATENT DOCUMENTS

| | | | |
|---|---|---|---|
| 2015/0028711 A1 | 1/2015 | Bulatow et al. | |
| 2015/0076935 A1 | 3/2015 | Bulatow et al. | |
| 2016/0072352 A1 | 3/2016 | Lee et al. | |
| 2016/0164374 A1* | 6/2016 | Yang | H02K 3/24 310/59 |
| 2018/0109170 A1* | 4/2018 | Park | H02K 3/487 |

FOREIGN PATENT DOCUMENTS

| | | |
|---|---|---|
| DE | 10 2009 046 716 A1 | 5/2011 |
| DE | 20 2012 000 842 U1 | 3/2012 |
| DE | 10 2011 121 793 A1 | 6/2013 |
| DE | 10 2016 205 813 A1 | 10/2017 |
| EP | 2 993 763 A2 | 3/2016 |
| EP | 2 807 728 B1 | 9/2016 |
| EP | 2 502 331 B1 | 12/2019 |
| JP | 2011-72128 A | 4/2011 |

OTHER PUBLICATIONS

German-language Written Opinion (PCT/ISA/237) issued in PCT Application No. PCT/EP2018/076260 dated Dec. 3, 2018 (eight (8) pages).

German-language Search Report issued in German Application No. 10 2017 222 610.2 dated Jun. 13, 2018 with partial English translation (11 pages).

English translation of Chinese-language Office Action issued in Chinese Application No. 201880070630.2 dated Nov. 3, 2021 (6 pages).

* cited by examiner

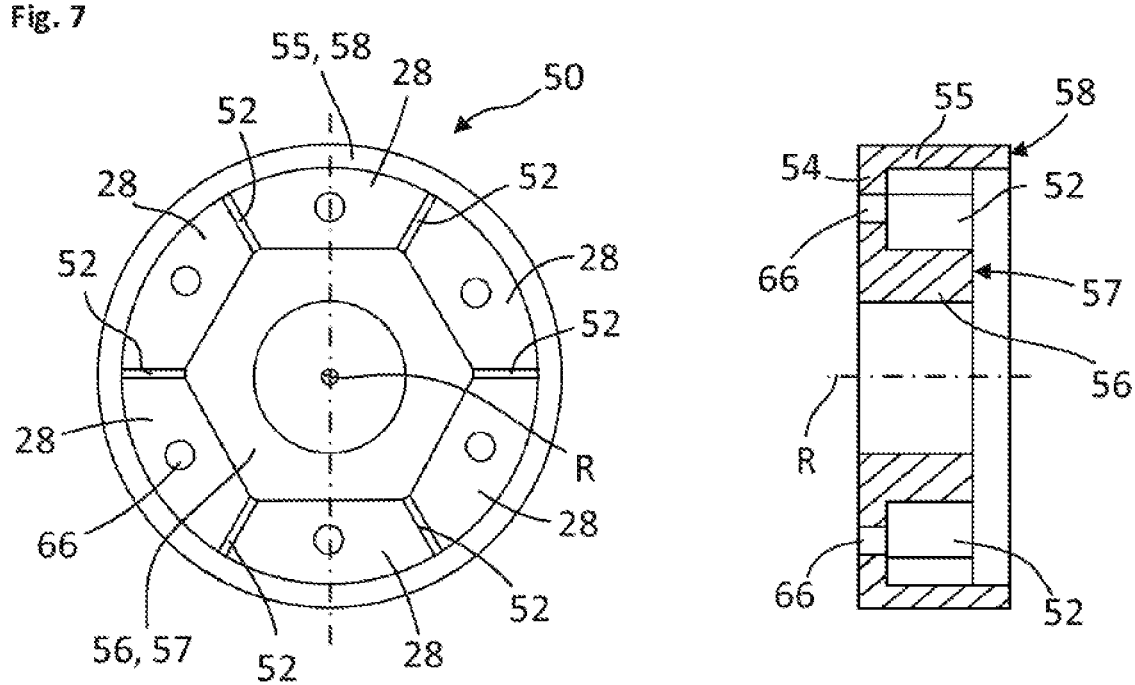

ROTOR AND METHOD FOR PRODUCING A ROTOR

BACKGROUND AND SUMMARY OF THE INVENTION

The present invention relates to a rotor for an electric machine and to a method for producing a rotor.

The use of electric traction machines for hybrid and electric vehicles requires a high power density and an optimum efficiency combined at the same time with low costs. In order to meet the requirements, a cost-optimized construction on the one hand and a design to the limit of the component strength on the other hand are necessary. High-speed electric machines ensure a high power density but also lead to high mechanical loads. It is known from the prior art in this connection to provide the rotors with a potting compound, cf. for example EP 2 807 728 B1, in particular for current-excited synchronous machines, or DE 10 2009 046 716 A1, for permanent magnet-excited machines. DE 10 2016 205 813 A1 teaches encapsulation by injection-molding, for example. A problem here is that, during potting or encapsulating, binding seams occur if two flow fronts meet one another. The strength values of the binding seams lie considerably below the material characteristic values of the material of the potting compound. This results, in particular at high rotational speeds, in critical stress states during operation that can lead to crack formation in the potting compound.

It is therefore an object of the present invention to provide a rotor and a method for producing a rotor which overcome the aforementioned disadvantages and in particular allow maximum motor rotational speeds.

This object is achieved by a rotor and by a method according to the claimed invention.

According to the invention, a rotor for an electric machine comprises at least one groove, wherein the at least one groove has a groove bottom and groove walls which extend in particular or substantially radially, and wherein a separating element is provided between the groove walls and extends along the groove or along an axis of rotation of the rotor, and wherein the separating element is arranged or fastened on the groove bottom, or extends radially away therefrom, at least in certain portions in such a way that groove chambers are formed along the groove. According to a preferred embodiment, the electric machine is a separately excited or current-excited synchronous machine. This motor type offers the advantage inter alia that its production requires no rare earths. The rotor preferably comprises a plurality of grooves, for example eight, and a corresponding number of rotor teeth and separating elements. The groove walls are formed by the pole teeth or the rotor teeth. The winding is arranged around the rotor teeth or pole teeth, with the result that the separating element(s) is/are arranged as it were between the windings of adjacent rotor teeth. Here, the separating element(s) is/are arranged or else fastened in particular on the groove bottom in such a way that the groove chambers are formed along the groove. As a result, there can be advantageously formed a groove chamber segment which runs around a rotor tooth and which encloses the rotor tooth or a pole tooth, preferably fully circumferentially, and thus also on the end side. The aforementioned groove chambers here form the axial part of the groove chamber segments. A groove chamber segment running around in such a way can substantially avoid the occurrence of binding seams or facilitates positioning thereof at non-critical points, since the groove chambers guide or channel the potting compound during potting.

According to a preferred embodiment, the separating element separates the groove chambers completely. The separating element is thus preferably fastened over its entire length on the groove bottom in a form-fitting and/or force-fitting or else integrally bonded manner. This does not mean that it has to be continuously fastened. This is possible, but not necessarily required. Nor is it necessarily required that the separating element is fastened on the groove bottom in a completely gap-free manner. The separating element is as such preferably closed or tight, thereby ensuring that a closed groove chamber or a closed groove chamber segment can be formed. Alternatively, the separating element, at least in certain portions, can also have cutouts, openings or the like, with the result that an additional form fit and an additional retention of the separating element can be brought about by the potting compound. According to one embodiment, the separating element or a wall of the separating element comprises a (surface) structure, for example comprising projections and/or recesses which allow a form fit with the potting compound, with the result that the potting compound can for example advantageously interlock with the separating element. The separating element is preferably designed to be rectilinear or substantially rectilinear along the axis of rotation, but alternatively can also be formed to deviate therefrom at least in certain portions in order, for example, to influence the flow behavior of the potting compound.

According to one embodiment, the separating element is arranged or fastened on the groove bottom in particular in a form-fitting manner. According to one embodiment, the groove bottom for example is formed with a geometry into which the separating element can be inserted along the axis of rotation or rotor axis, in particular in a form-fitting manner, and retained. According to one embodiment, a rotor laminated core is provided with an impregnation which has been applied for example by an injection-molding method. Here, for example, a corresponding geometry is provided on the groove bottom, for example in the form of a clamp, an undercut or a groove, which allows the arrangement and retention of the separating element.

According to one embodiment, the separating element or the separating elements is/are shaped or formed directly by the aforementioned injection-molding method, that is to say in particular formed together with the impregnation or together with an insulating layer.

According to one embodiment, the separating element is wedge-shaped or substantially wedge-shaped in cross section, in particular in the form of a wedge which tapers in the direction of the axis of rotation. According to one embodiment, the separating element is configured in particular in such a way that a distance between the separating element and the adjacent windings is designed to be substantially constant in the radial direction, which can be advantageous for the potting. Additionally or alternatively, the separating element is formed in such a way that it contacts or bears against the windings at least in certain portions in the radial direction and/or along the axis of rotation, with the result that additional fixing of the winding(s) can be achieved.

The separating elements allow better and more complete encasing of the windings/wires with potting compound to be achieved, since the potting compound, during potting or encapsulation, does not prefill the groove(s) and solidify there before it has flowed between the wires, but instead is as it were pushed or "forced" or pressed by the wires/ windings. This makes it possible to achieve such a stable and solid rotor construction that further supporting measures can be dispensed with.

According to one embodiment, the separating element as such is designed to be solid or stiff and thus suitable for stiffening the entire arrangement. According to different embodiments, the separating element is manufactured from a plastics material, such as a thermoplastic or a thermoset, or from a composite material. Alternatively or in combination, the separating element is manufactured from a metal material, for example aluminum. According to one embodiment, the separating element is formed as a hollow body, with the result that the weight of the entire arrangement can be reduced. Alternatively, the separating element is designed to be elastic and is formed for example by an elastomer strip or Nomex strip.

According to one embodiment, the separating element takes the form of an I-profile, that is to say advantageously has a shape which can be produced very simply and thus in a cost-effective manner.

According to one embodiment, the separating element has a cover element or comprises such a cover element, wherein the cover element is designed to close the groove in the radial direction or outwardly. Such a cover element is for example also referred to as a cover slide. The cover element is preferably designed to completely close the groove, in particular along the axis of rotation. Here, the cover element can be formed as a separate component which is subsequently arranged or else alternatively can be formed as a part or portion of the separating element. Particularly if the separating element is wedge-shaped, the wedge can be configured in such a way that the cover element is as it were concomitantly formed. According to an alternative embodiment, the separating element for example takes the form of a T-profile, with the result that the separating function, for the formation of the two groove chambers, and the cover function, for closing off the groove to the outside, are provided in a simple manner.

As already mentioned, the rotor preferably comprises a plurality of rotor teeth, wherein groove chamber segments which run around the rotor teeth are formed by the separating elements. The formation of critical binding seams can thus advantageously be substantially avoided or at least moved into noncritical regions. According to one embodiment, the respective groove chamber segments are filled with potting compound separately from one another, but preferably indeed at the same time, with expediently one injection point being provided for each groove chamber segment for this purpose.

According to one embodiment, the separating element(s) projects/project beyond a rotor laminated core of the rotor at the end side. The separating element preferably projects beyond the rotor laminated core at the end side at both ends. This ensures that a groove chamber segment which runs around completely can be formed around one rotor tooth in each case, said groove chamber segment comprising two axially extending groove chambers and two groove chambers extending at the end side. According to a preferred embodiment, end disks or star-shaped disks are arranged at the ends of the rotor laminated core and serve to deflect the wires of the windings and additionally to fix them. There is thus expediently a laminated core region and a winding head region. The separating elements can advantageously project into the winding head region.

It should be mentioned at this point that, according to a preferred embodiment, supporting rings are additionally provided at both rotor ends, which allow additional stability and fixing and are mounted onto the star-shaped disks with the aid of a press fit, for example.

According to one embodiment, the rotor comprises at least one end element which is or can be arranged at the end side of the rotor or of the rotor laminated core (preferably at both ends), wherein the end element is formed in such a way that it continues a shape or geometry of the separating elements. In particular, the end element has an inner structure or a ribbing which forms webs which are adapted in cross section to the cross section of the separating elements. The groove chambers can thus be continued at the end sides. According to a preferred embodiment, the end element is manufactured, for the purpose of weight reduction, from an aluminum material or composite material, such as, for example, a glass- or carbon-fiber-reinforced plastic. The end element preferably has a cylindrical portion and an end portion, wherein, according to one embodiment, the end portion takes the form of a circular disk which is approximately perpendicular to the axis of rotation, whereas the cylindrical portion is designed and formed in such a way that it radially encloses the winding head region of the rotor. The cylindrical portion preferably comprises an outer sealing region or an outer sealing surface which is provided to bear against the rotor. The end element advantageously has a flange region which extends away from the end portion in the direction of the rotor. The aforementioned ribbing expediently extends between the cylindrical portion, the end portion and the flange region. Expediently formed on the end side of the flange region is an inner sealing region or an inner sealing surface which is formed for example as a circular ring surface and is designed for bearing or arranging on a corresponding surface of the rotor in the winding head region. The groove chamber segment can thus expediently be closed inwardly, that is to say toward the axis of rotation. Toward the outside, the groove chamber segment is closed by the cylindrical portion, comprising the outer sealing region. Sealing elements can be provided for additional sealing both at the inner sealing region and at the outer sealing region.

Alternatively, the function and geometry of the end portion can also be provided by a mold, in particular an injection mold, in which the rotor is inserted or arranged for encapsulation. However, the use of the end elements is indeed advantageous since the arrangement thereof ensures additional stability.

The rotor expediently comprises a potting compound, wherein the potting compound is applied by axially overmolding the rotor. Depending on the embodiment, the potting compound can be a plastics material, for example a thermoplastic, but particularly preferably a thermoset. The injection points can be provided for example in the aforementioned end portion of an end element. The potting compound is preferably applied by injection-molding. For this purpose, the rotor is inserted into a suitable injection mold and preferably encapsulated with a thermoset.

A plurality of injection points are expediently provided, with the potting compound being channeled to the rotor via the injection points.

The invention is also directed at a method for producing a rotor, comprising the following steps:
  arranging a rotor according to the invention in an injection mold;
  axially encapsulating or overmolding the rotor with potting compound.

A main flow direction of the potting compound is thus directed along the rotor axis. The overmolding or encapsulation preferably occurs with or in an injection mold, with injection pressures of 500 bar and more being used for complete encapsulation. The rotor and the method allow critical stress states to be avoided and thus lead to lower residual stresses in the rotor. In particular, the number of binding seams can be reduced or displaced into noncritical regions. Better encasing of the windings or wires is also made possible, since, during overmolding or encapsulation, the potting compound does not prefill the groove and solidify there before it has flowed between the wires, but is as it were "forced" by the wires. Further supporting measures can advantageously be dispensed with.

According to one embodiment, the method comprises the following steps:

providing a plurality of injection points;

positioning the injection points in each case circumferentially between two separating elements.

The injection points are preferably positioned substantially above the winding heads if the rotor stands vertically for encapsulation.

According to one embodiment, the method comprises the following step:

positioning at least one injection point to be set back from a line of symmetry of a rotor tooth.

It is thus possible to ensure that the binding seam occurring during potting can be placed for example in the groove or in the groove chamber in the region of the laminated core. Particularly if the separating element comprises a cover element there, this point or position is extremely noncritical.

The invention also relates to an electric motor, comprising a rotor according to the invention. The electric motor can take the form of a separately excited or current-excited synchronous machine. It can be formed either as an inner or outer rotor. In addition, the motor can also be a permanent magnet-excited synchronous machine.

The advantages and features mentioned in connection with the rotor apply analogously and correspondingly to the method and the electric motor, and vice versa.

Further advantages and features will emerge from the following description of different rotors or components with reference to the appended figures. Different features can here be combined with one another within the scope of the invention.

BRIEF DESCRIPTION OF THE DRAWINGS

FIG. 7 shows two views of one embodiment of an end element.

DETAILED DESCRIPTION OF THE DRAWINGS

Figure 1:
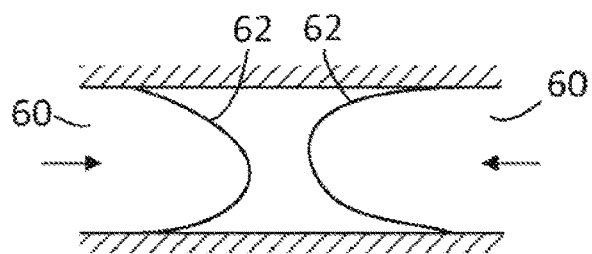
FIG. 1 is a schematic diagram for illustrating the occurrence of binding seams.
Figure 1:
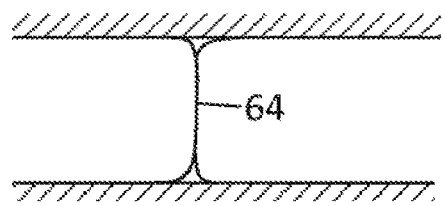

FIG. 1 schematically shows the formation of two flow fronts 62 which occur as a result of potting compound 60, as indicated by the arrows, being injected through a duct or the like. When two such flow fronts 62 meet, a binding seam 64 occurs in the contact region, cf. the lower image half. The strength values thereof lie considerably below the actual strength values of the potting compound 60. In the case of a rotor, the challenge arises in particular of both avoiding such binding seams and at least moving them into noncritical regions.

Figure 2:
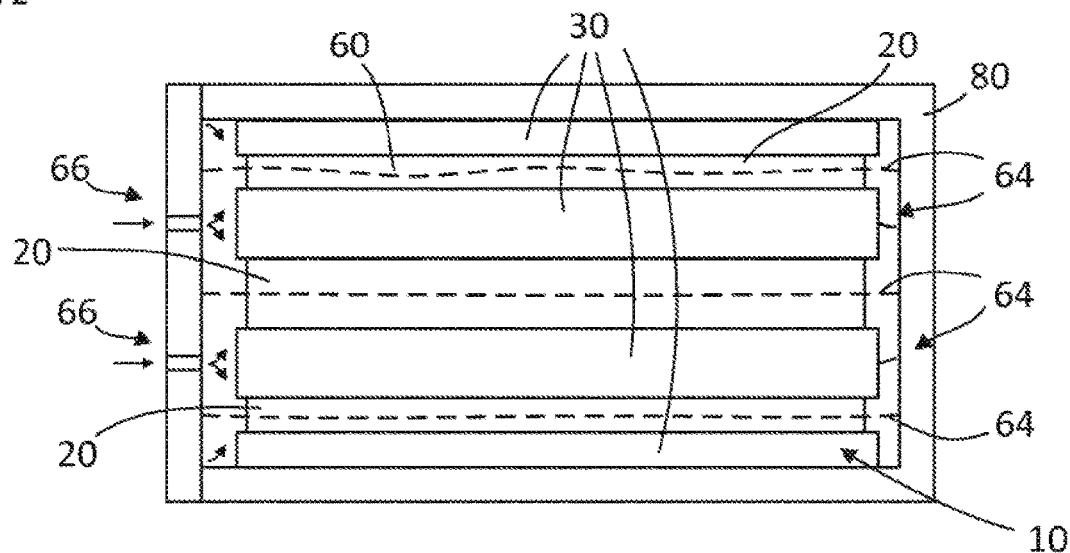
FIG. 2 shows a rotor without separating elements and the formation of binding seams.

FIG. 2 schematically shows a rotor 10 which is arranged in an injection mold 80. The rotor has a plurality of rotor teeth or pole teeth 30, with rotor grooves 20 being formed between them. When potting compound 60 is axially injected via injection points 66 positioned at the end side, the formation of binding seams 64 occurs both within the grooves 20 and at the end side as a result of the distribution of the potting compound 60. The flow of the potting compound is schematically depicted by the small arrows.

Figure 3:
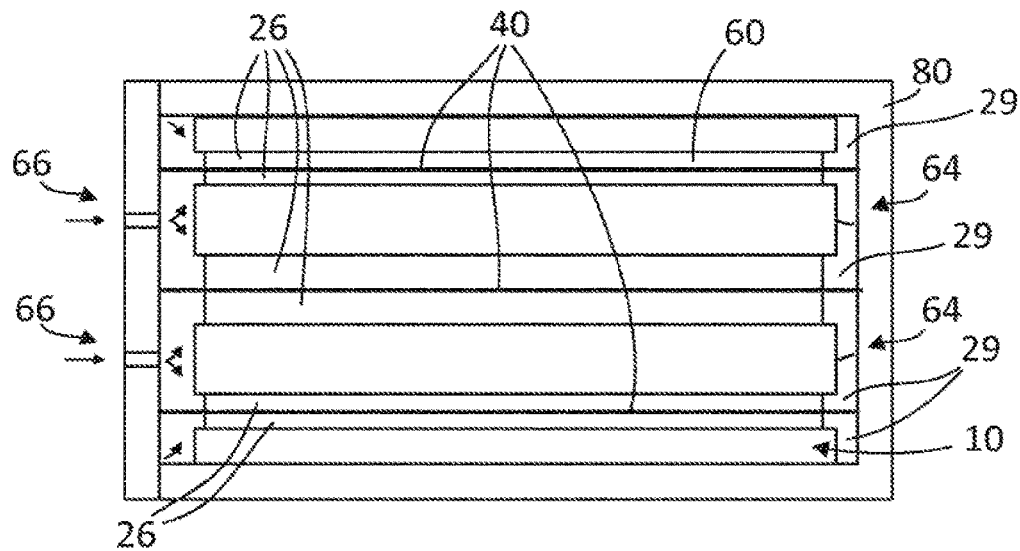
FIG. 3 shows a rotor with separating elements.

FIG. 3 shows, by contrast, that groove chambers 26 are formed by separating elements 40 and prevent the formation of binding seams 64 in these regions. Instead, binding seams 64 are provided only at the end side. The separating elements 40 are positioned at locations where previously the binding seams 64 occurred. Instead of flow fronts of potting compound 60 now colliding at this point or at these points, they strike separating elements 40. Depending on the positioning of the injection points 66, the position of the end-side binding seams 64 can additionally be displaced. It is clearly evident from this schematic view that groove chamber segments 29 which each surround the individual rotor teeth or the rotor teeth can be formed by the shape and position of the separating elements 40 which project beyond the rotor 10 at the end side.

Figure 4:
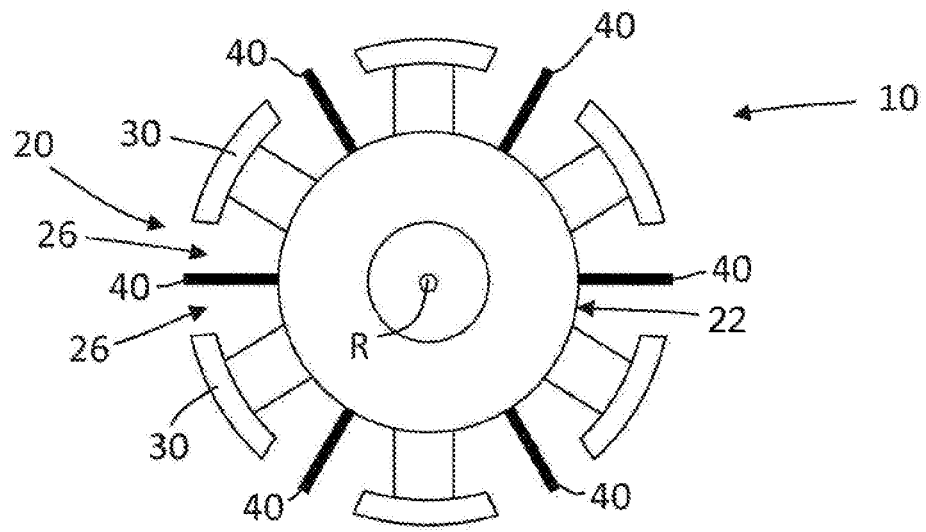
FIG. 4 shows a rotor with separating elements, as seen along an axis of rotation.

FIG. 4 shows, as seen along an axis of rotation R, a schematic view of a rotor 10, comprising a plurality of rotor teeth or pole teeth 30 and grooves 20 arranged therebetween. Separating elements 40 are arranged circumferentially in the grooves 20, with the result that groove chambers 26 are formed which extend along the axis of rotation R. It should be emphasized in particular that the separating elements 40 are arranged or fastened directly on a groove bottom 22. A complete separation into groove chambers 26 extending along the axis of rotation R is thus ensured.

Figure 5:
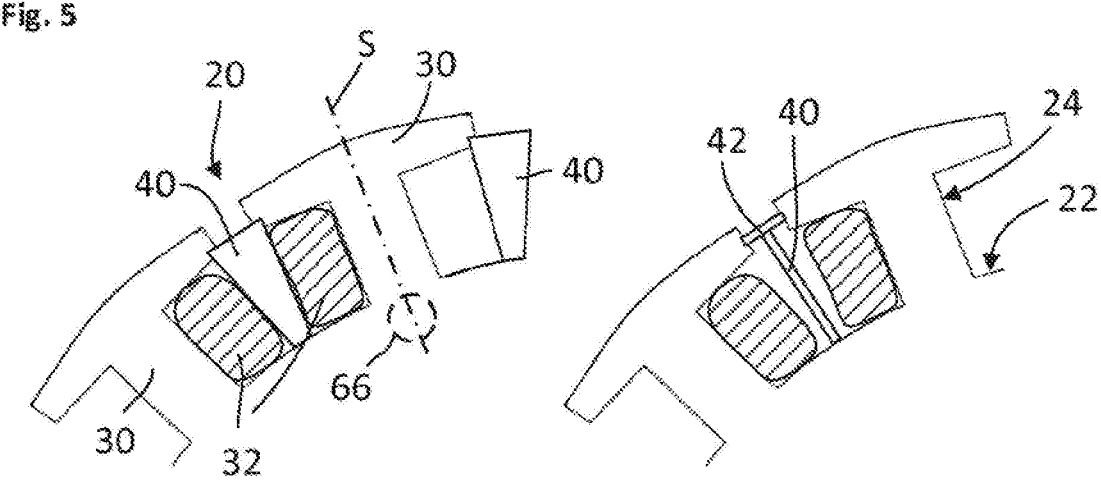
FIG. 5 shows two partial views of rotors having differently shaped separating elements.

FIG. 5 schematically shows in its left image half a detail of a rotor with two rotor teeth 30 and a substantially wedge-shaped separating element 40 arranged therebetween. Also indicated in this embodiment are wires or windings 32. The wedge-shaped form of the separating element 40 closes off a groove 20 to the outside. By contrast, an approximately T-shaped separating element 40 which comprises a separate cover element 42 is illustrated in the right image half. The separating element 40, comprising the cover element 42, can be formed in one piece or integrally or else separately, in particular in two parts. According to one embodiment, the cover element 42 is also arranged only subsequently, with it being connected for this purpose to the separating element 40 in a form-fitting manner for example. The reference sign 24 denotes a groove wall, whereas the reference sign 22 denotes a groove bottom. Returning to the left image half, reference should also be made to a line of symmetry S of the rotor tooth 30, with an injection point 66 being depicted (by dashes) relative thereto. Depending on the embodiment, it can also be positioned to be offset from the line of symmetry S, with the result that the encapsulation or potting and hence also form and position of a binding seam can be set. The injection point 66 can also be displaced in the radial direction. A plurality of injection points 66 are preferably provided, as becomes clear for example with reference to FIG. 7.

Figure 6:
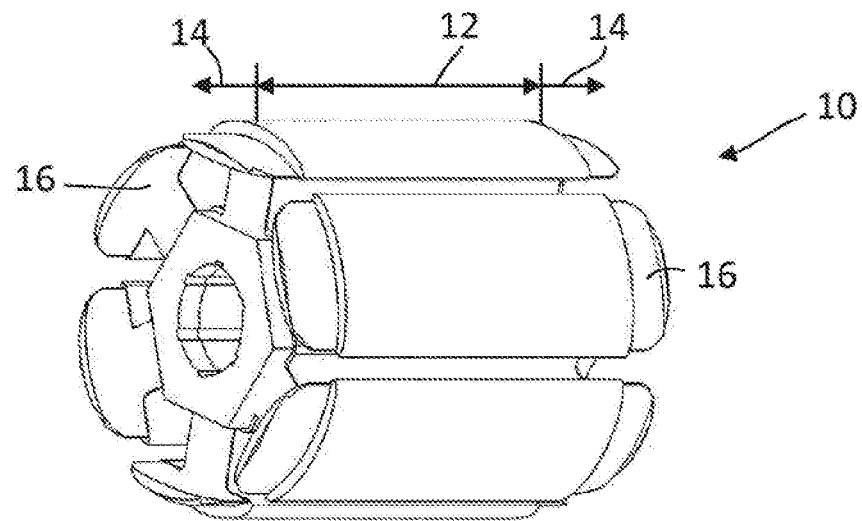
FIG. 6 is a perspective view of a rotor.

FIG. 6 is a perspective view showing a rotor 10, comprising a rotor laminated core 12 and adjoining winding head regions 14. End disks or star-shaped disks 16 are arranged on each end side of the rotor laminated core 12, said disks deflecting the wires or windings and additionally fixing them, in particular by virtue of their shape. Supporting rings, which, however, are not illustrated here, can be arranged on the star-shaped disks or end disks 16 for additional stability and fixing, for example by means of a press fit. Said supporting rings can also support the separating elements in the radial direction. FIG. 6 is intended in particular to illustrate the form and position of the winding head regions 14 into which separating elements can project.

FIG. 7 shows two views of an end element 50, with the right image half illustrating a sectional illustration, cf. the section line in the left image half. A plurality of webs 52 can be seen in particular in the left image half, these webs expediently being formed in such a way that they interact with or continue separating elements as are depicted for example in the rotor from FIG. 4. Such an end element 50 or such end elements 50 are fastened on the end side of the rotor ends, cf. in this respect in particular FIG. 6. End-side chambers 28 as it were which continue the axial groove chambers are formed by the structure or inner-side ribbing, comprising the webs 52, with the result that groove chamber segments can be formed around the rotor teeth. The end-side groove chambers 28 are closed radially to the outside by a cylindrical portion 55 of the end element 50 and radially to the inside via a flange region 56. The axial closure to the outside is formed by an end portion 54 and to the inside, that is to say toward the rotor, by an inner sealing region 57. The end element 50 further comprises a plurality of injection points 66, expediently arranged in the end portion 54. The position thereof can also be seen in the right image half, with in particular also the basic structure of the end element 50, comprising the end portion 54 and the cylindrical portion 55, being evident in this arrangement. An outer sealing region 58 is formed on the cylindrical portion 55. The flange region 56 extends from the end portion 54 in the direction of the or a rotor and has the inner sealing region 57 at the end side. In combination with FIG. 6, the action of the sealing surfaces 57 and 58 and the possible arrangement of the end element 50 on a rotor become very clear and understandable.

LIST OF REFERENCE SIGNS

10 Rotor
12 Rotor laminated core
14 Winding head region
16 Star-shaped disk/end disk
20 (Rotor) groove
22 Groove bottom
24 Groove wall
26 Groove chamber
28 End-side chamber
29 Groove chamber segment
30 (Rotor) tooth
32 Winding
40 Separating element
42 Cover element
50 End element
52 Web
54 End portion
55 Cylindrical portion
56 Flange region
57 Inner sealing region
58 Outer sealing region
60 Potting compound
62 Flow front
64 Binding seam
66 Injection point
80 Injection mold
R Rotor axis, axis of rotation
S Line of symmetry

What is claimed is:

1. A rotor for an electric machine, comprising:
a plurality of grooves, wherein each groove of the plurality of grooves has a groove bottom and groove walls; and
a plurality of separating elements, wherein:
each separating element of the plurality of separating elements is provided between the groove walls of a respective groove of the plurality of grooves and extends along the respective groove,
each separating element is arranged on the groove bottom of the respective groove such that groove chambers are formed along the respective groove,
each separating element is positioned at a respective location where two respective flow fronts of potting compound injected into the rotor would meet each other in the absence of the separating element, and
each separating element is positioned at an equal distance from two injection points through which the potting compound is injected.

2. The rotor according to claim 1, wherein each separating element completely separates the groove chambers of the respective groove.

3. The rotor according to claim 1, wherein each separating element is arranged and fastened on the groove bottom of the respective groove.

4. The rotor according to claim 1, wherein each separating element is wedge-shaped in cross-section.

5. The rotor according to claim 1, further comprising:
a plurality of rotor teeth between which are arranged respective separating elements, wherein
groove chamber segments which run around the rotor teeth are formed by the separating elements.

6. The rotor according to claim 1, wherein each separating element projects beyond a rotor laminated core of the rotor at an end side.

7. The rotor according to claim 6, further comprising:
an end element which is arranged at the end side of the rotor, wherein
the end element comprises a web that is aligned with each separating element.

8. The rotor according to claim 1, further comprising:
the potting compound, wherein
the potting compound is applied by axially overmolding the rotor.

9. A method for producing a rotor, comprising:
arranging a rotor in an injection mold, the rotor comprising:
a plurality of grooves, wherein each groove of the plurality of grooves has a groove bottom and groove walls; and
a plurality of separating elements, wherein:
each separating element of the plurality of separating elements is provided between the groove walls of a respective groove of the plurality of grooves and extends along the respective groove,
each separating element is arranged on the groove bottom of the respective groove such that groove chambers are formed along the respective groove, and
each separating element is positioned at a respective location where two respective flow fronts of potting compound injected into the rotor would meet each other in the absence of the separating element;

providing a plurality of injection points through which the potting compound is injected, wherein the injection points are positioned such that each separating element is arranged at an equal distance from two of the injection points; and axially encapsulating or overmolding the rotor with the potting compound.

* * * * *